April 27, 1937.   D. W. MAIN ET AL   2,078,397
COMBINED ROAD AND RAIL VEHICLE
Filed Nov. 18, 1935
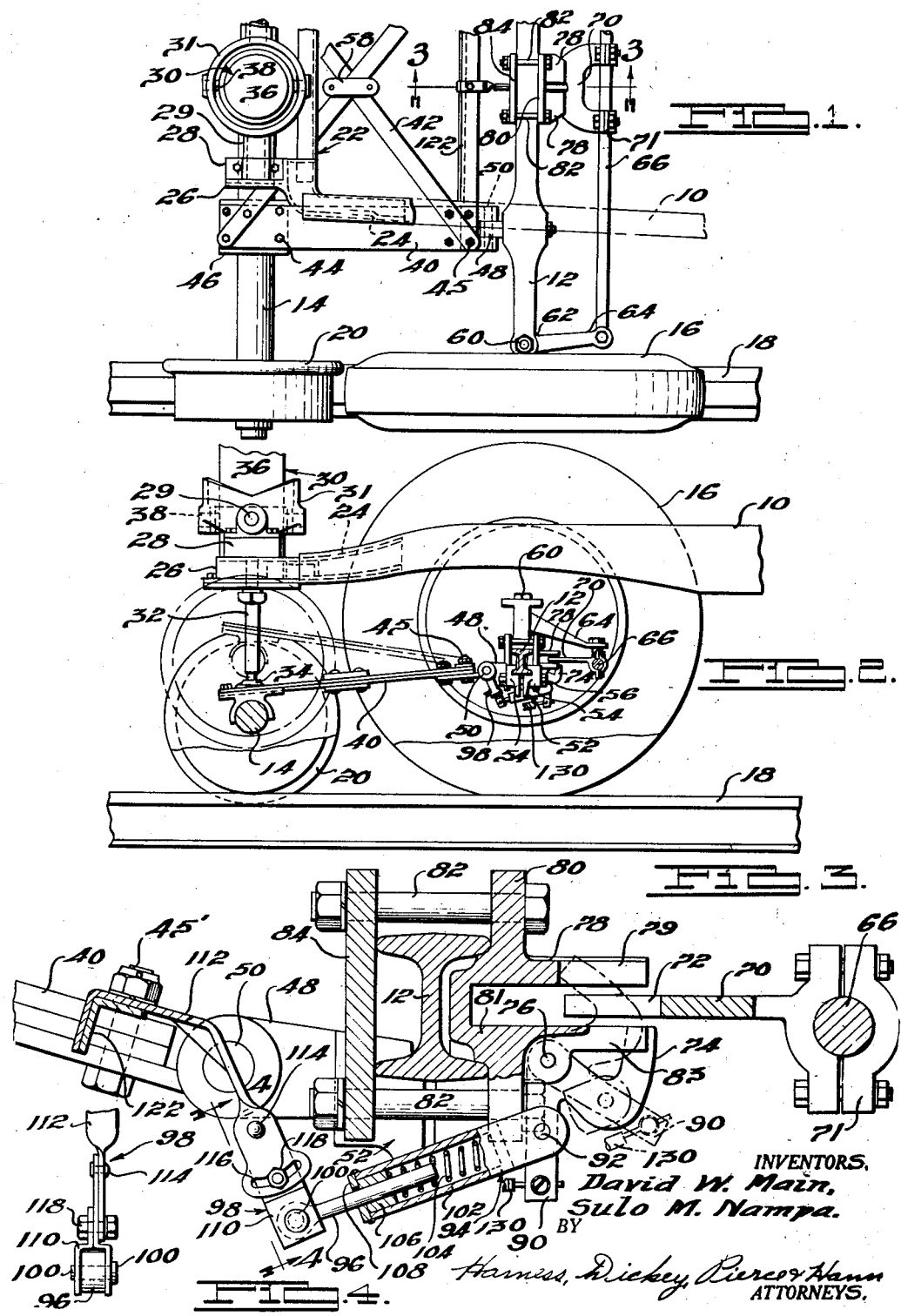

Patented Apr. 27, 1937

2,078,397

UNITED STATES PATENT OFFICE 2,078,397

COMBINED ROAD AND RAIL VEHICLE

David W. Main and Sulo M. Nampa, Detroit, Mich., assignors to Transportation Systems, Inc., a corporation of Oklahoma Application November 18, 1935, Serial No. 50,288

12 Claims. (Cl. 105—215)

The present invention relates to vehicles of the combined road and rail type, and in particular provides an improved vehicle of this character embodying a main axle having dirigible wheels a pilot axle having pilot wheels for guiding the main wheels during track travel, and means to automatically lock the dirigible wheels in straight-ahead position during track travel.

Objects of the present invention are to provide a combined road and rail vehicle embodying a main axle having dirigible wheels associated therewith, a pilot axle and associated wheels selectively raisable and lowerable from and to track engaging position, and embodying means controlled in accordance with the raised or lowered position of the pilot axle for controlling the steering mechanism; to provide such a vehicle embodying means to lock the steering mechanism when the pilot axle is in track engaging position; to provide such a vehicle embodying means responsive to the lowering of the pilot axle for engaging and locking the steering mechanism; and to provide such a vehicle in which the locking means may be pre-set by lowering the pilot axle independently of the position of the steering mechanism, and becomes effective to lock the latter upon movement thereof to a position in which the main wheels are forwardly directed.

Further objects of the present invention are to provide a road and rail vehicle of the general character above stated, embodying means for pivotally connecting the pilot axle to the main axle, and embodying locking mechanism carried by said means for engaging and locking the steering mechanism associated with the main wheels in a central position; to provide such a vehicle embodying a dog carried by the pivotal connecting means, cooperable with a plate member secured to a part of the vehicle which moves with the steering mechanism, the dog being adapted to enter an opening formed in the plate when the steering mechanism reaches a central position, to thereby lock the latter in said central position; and to provide such a construction embodying a lost motion connection between the pivotal connecting means and the dog, so that the dog may be pre-set to lock the steering mechanism.

Further objects of the present invention are to provide a combined road and rail vehicle embodying means for locking the steering mechanism associated with the main vehicle wheels in a central position, which may selectively be operated either manually or in response to the lowering of a pilot axle to track engaging position.

Other objects appear in the following description and in the appended claims.

The present invention is applicable to road and rail vehicles generally, but, in the preferred and illustrated embodiment, is applied to a vehicle of the type disclosed and claimed in the patent to David W. Main, No. 2,002,901, granted May 28, 1935. Such a vehicle may comprise, in general, a frame or body portion suspended in a conventional way from front and rear main axles which function to drive, and, during road travel, to permit steering of the vehicle in the usual way. To guide the main wheels and to retain them on the track during track travel, one or more pilot axles and associated wheels are provided for each pair of main wheels, which are connected to the vehicle in such a way that they may be lowered into track engaging position during track travel and retracted or raised away from track engaging position during road travel. During track travel it is desirable to lock any of the dirigible wheels of the vehicle in a straight ahead position and one means for accomplishing this locking is shown in the above identified Main patent, over which the present invention is an improvement.

In accordance with the illustrated form of the present invention, the locking is effected automatically as an incident to the lowering of a pilot axle to track engaging position, the lowering of the pilot axle pre-setting the locking mechanism, which thereafter becomes effective, when the dirigible wheels reach a straight ahead position, to lock them in that position. A further feature of the present invention resides in arranging the locking mechanism so that it may be controlled either manually or automatically, the manual means being effective to prevent movement of the locking mechanism to locking position even though the pilot axle is lowered to track engaging position.

In operation the steering control mechanism of the present invention has been found to provide a substantial advantage, first in facilitating the transfer of the vehicle from road travel to track travel, and, second, in insuring that during track travel the steering mechanism will be properly locked. This construction is further advantageous in that it is very readily applicable to existing vehicles, and is particularly adapted for use with vehicles designed for relatively rapid road and rail travel, in the construction of which it is essential to maintain the pilot mechanism as light in weight, and as limited in size, as possible.

In the drawing, which illustrates a preferred embodiment of the present invention, specifically adapted for the control of the steering mechanism associated with the front wheels of a vehicle, and throughout the several views of which corresponding reference characters are used to designate corresponding parts:

Figure 1 is a partial top plan view of the invention;

Fig. 2 is a view in side elevation of the structure shown in Fig. 1;

Fig. 3 is a view in vertical section, taken along the line 3—3 of Fig. 1; and

Fig. 4 is a fragmentary view in elevation, taken along the line 4—4 of Fig. 3.

Considering the drawing in detail, the illustrative front end of a combined road and rail vehicle having a frame 10 is provided with a main front axle 12 and a pilot axle 14. The main front wheels associated with the main axle 12, one of which is shown and designated 16, are adapted to ride either upon a roadway or upon rails, one of which is designated 18. It will be understood that the spacing between the main wheels 16 corresponds to the spacing between the respective rails 18 of the track. Pilot axle 14 is provided with a pair of flanged wheels 20 of substantially smaller radius than the main wheels 16 and the spacing between which also corresponds to the spacing between the tracks 18.

Main axle 12 may be sprung from the vehicle frame 10 in a conventional manner and the connecting elements have been omitted from the drawing to simplify it. The pilot axle 14 is suspended from an auxiliary frame 22, each rearwardly extending leg 24 of which is suitably secured within the corresponding frame member 10 and each forwardly extending portion 26 of which forms a seat for a bearing boss 28 within which trunnions 29 associated with a cylinder cradle 31 are pivotally supported. This auxiliary frame is preferably constructed as described in the previously identified Main patent and forms no part of the present invention so that further description thereof is considered unnecessary. The connection between the auxiliary frame 22 and pilot axle 14 is illustrated as comprising an air operated ram 30, the downwardly extending piston rod 32 of which is connected to pilot axle 14 by a ball and socket universal joint 34, and the cylinder 36 of which is universally supported on frame 22 by cradle 31. This universal mounting is preferably of the type disclosed and claimed in the co-pending application of Sulo M. Nampa, Serial No. 50,384, filed November 18, 1935, and in general may be described as one in which the cylinder 36 is provided with trunnions 38 having bearing in cradle 31, whereby it is pivotally supported within the cradle for rotation about a predetermined axis, and the cradle in turn is pivotally supported by trunnions 29 upon the bosses 28 for rotation about an axis normal to such axis. The resulting structure provides complete universal movement between the ram 30 and the auxiliary frame 22 which, in combination with the universal joint 34 absorbs any transverse displacement which may occur during operation between the auxiliary frame and the pilot axle.

Ram 30 may be provided with suitable connecting means to effect the raising and lowering of the associated piston 32 within cylinder 36 and a corresponding raising and lowering of pilot axle 14 and pilot wheel 20. Connections for accomplishing this may be arranged in various ways, such, for example, as shown in the above identified Main patent, and it will be understood that when it is desired to operate the vehicle on a roadway, pilot axle 14 and wheels 20 are raised by a corresponding raising of piston rod 32, and when it is desired to operate the vehicle on a trackway, the pilot axle 14 and pilot wheels 20 are lowered through a corresponding lowering of the piston rod 32. In lowered position, the pilot axle 14 may be caused to absorb a desired proportion of the total vehicle load by correspondingly adjusting the pressure within cylinder 30. A compressible fluid, such as air, is preferably used as an actuating medium, so that the connection afforded between the pilot axle and the vehicle is resilient.

In order to render the pilot wheels 20 effective to properly guide the main wheels 16, when the former are in track engaging position, a supplemental and aligning connection is provided between the pilot axle 14 and the main axle 12, comprising a cross frame formed of the forwardly extending arms 40 which are interconnected by the cross struts 42. The forward end of each arm 40 is preferably rigidly connected as by studs 44 to an associated seat 46 which may be rigidly secured, as by welding, to pilot axle 14. The rear end of each arm 40 is preferably pivotally connected to the main axle 12 through a relatively short link 48 and a pin 50. Each link 48 forms a part of a split bracket 52, having engaging portions 54 which are secured on opposite sides of axle 12 by a stud 56. The cross struts 42 are secured at the respective ends to arms 40 by studs 45 and the previously mentioned studs 44, and are also interconnected at their midpoints by a suitable clip 58.

As will be evident, the arms 40 and the cross struts 42 form a relatively rigid frame, which engages the main pilot axis at points spaced substantial distances from the centers thereof, and act to substantially eliminate any lateral or crosswise movement of either axle with respect to the other. Through its hinged connection with the main axle 12, however, the frame permits a relatively free vertical movement of pilot axle 14 with respect to the main axle 12 such, for example, as may be encountered in operation due to track irregularities, and such as accompany a raising operation of the pilot axle 14 from the track engaging position. It is noted that the raising and lowering of pilot wheels 20 as affected by track irregularities may be different for each wheel, and, consequently, one wheel 20 may be raised from the track-way while the other wheel remains in engagement therewith. Under these conditions, a rotation of the pilot axle about such engaging wheel as a center results. If the frame comprising arms 40 and struts 42 were in fact absolutely rigid, it is recognized that this tilting could not occur and that an irregularity of either side would, therefore, raise or lower both pilot wheels simultaneously. It has been found in practice, however, that the frame comprising arms 40 and struts 42 may be made sufficiently rigid to reduce lateral or crosswise movement between axles 12 and 14 to a permissible point and still permit any required amount of raising one pilot wheel without affecting the position of the other pilot wheel. The construction thus afforded, accordingly, maintains the main pilot wheels accurately in alignment, positively guiding and maintaining the main wheels upon the track during track operation and still permits the pilot wheels to individually follow any irregularities which they may encounter.

Considering now the steering control elements, the main wheels 16 are dirigibly connected to the main axle 12 through a conventional wrist pin 60, and knuckle bracket 62, the rearwardly extending end 64 of which is pivotally connected to the usual tie rod 66. This steering mechanism may be operatively associated with the usual vehicle steering wheel in the usual way and the details of this arrangement have been omitted from the drawing to simplify them.

At a point intermediate its ends, the tie rod 66 is provided with a locking plate 70 which, as illustrated, extends in a forward direction and is provided at its front end with a longitudinally extending slot 72, which is adapted to register with and receive a locking dog 74 when the wheels 16 are in straight-ahead position. In moving transversely of the vehicle during steering, plate 70, which is secured upon rod 66 by split brackets 71, passes between upper and lower portions 78 and 81 of a dog supporting bracket 80.

The dog 74 is pivotally secured, by a pin 76, between the rearwardly extending and bifurcated legs 81 of a bracket plate 80. The portions 78 and 81 are each bifurcated as at 79 and 83, and dog 74 is pivoted to bracket 80 by pin 76 in such position that the free end thereof swings in a vertical plane into and out of such bifurcations. Bracket 80 is rigidly secured at substantially the mid-point of axle 12 by studs 82, and a cooperating plate 84, axle 12 being gripped between bracket 80 and plate 84.

The end 90 of dog 74 is pivotally connected by pin 92 to one end of a resilient connector 94, the end of the rod 96 of which is pivotally connected to an adjusting link 98 by a pin 100. Connector 94 comprises, in general, a casing 102 which is cored out to receive a compression spring 104, one end of which seats against the blind end of casing 102, and the other end of which seats against a plug 106 which is slidable within the casing 102. Rod 96 is axially fixed within the plug 106, and an end plate 108 is provided for the casing 102 which limits the expansion of spring 104.

The link 98 is formed in two parts adjustably secured together, the lower part 110 being bifurcated to receive the end of rod 96, and being pivotally connected at its upper end to the other link member 112 by a pin 114. The upper member 112 is provided adjacent its lower end with an elongated slot 116, and a locking stud 118 extends through both link members 110 and 112 to secure them together in desired angular relation.

The upper end of the upper link 112 extends toward the front of the vehicle and is rigidly connected by a stud 45' to a cross bar 122 which extends between the previously mentioned arms 40 and is secured thereto by means of studs 45. Link 98 and rod 96 thus move with the cross frame and pilot axle 14 and this motion is transmitted to dog 74 through spring 104.

To permit the dog to be manually moved to unlocking position, or retained in that position independently of the position of pilot axle 14, a manual connection, illustrated as comprising a conventional Bowden wire 130 is suitably secured to the extension 90 of dog 74. Wire 130 preferably extends into the vehicle for convenient operation by the operator.

The parts are shown in Fig. 3 in the positions occupied by them when the pilot axle 14 is in raised position, thus adapting the vehicle for road travel. In this positioning of the parts, the upwardly directed cross-frame arms 40 retain dog 74 in a position in which the free end of the latter is below the path of travel of the tie rod plate 70, thus permitting free movement of the latter between the bracket portions 78 and 81, and permitting the main wheels 16 to be steered in the usual manner.

Downward movement of pilot axle 14 to track engaging position results in rotating arms 40 and adjustable link 98 in a counter-clockwise direction about the pivot 50, causing rod 96 to move to the right as viewed in Fig. 3. This rightward motion of rod 96 is transmitted to pin 92 through spring 104 and effects a corresponding counter-clockwise rotation of dog 74 about its pivot 76, bringing the free end thereof upwardly between the legs of bracket portion 81. If, at the time of this movement, the main wheels 16 are in straight ahead position, the slot 72 in the tie rod plate 70 is in registry with dog 74, which, accordingly, is permitted to be moved to the final dotted line position shown in Fig. 3. In this position, dog 74 imposes a positive limit to transverse movement of tie rod 66 and plate 70, thus preventing a steering movement of the main wheels 16. In the blocking position, dog 74 is supported against transverse movement by the bracket portions 78 and 81, being received within the bifurcations formed therein.

If at the time pilot axle 14 is lowered, the main wheels 16 are in other than a straight-ahead position, the opening in plate 70 is out of registry with dog 74 and the latter therefore is blocked by plate 70, spring 104 being compressed in response to the complete downward movement of axle 14. As soon, however, as wheels 16 are moved to a straight-ahead position, bringing the opening 72 into registry with dog 74, the latter immediately moves under the influence of spring 104 to the previously mentioned locking position.

The width of plate 70 is preferably such that even in extreme positions of wheels 16, dog 74 lies between the side edges of the latter so that, even if pilot axle 14 is lowered with the main wheels in such extreme position, it is not possible for dog 74 to be moved to a position in which it blocks a return movement of the wheels to the straight-ahead position.

It may happen from time to time that it is desired to retain the main wheels 16 in unlocked position, even though the pilot axle 14 is in track engaging position. The previously mentioned control member 130 provides this operation, as will be evident from the foregoing description. Member 130 may be actuated to withdraw dog 74 to the unlocked position, even though pilot axle 14 is in a lowered position, the withdrawing or return movement of dog 74 being absorbed in this instance by the spring 104. Similarly, a dog 74 may be retained by manual member 130 in the unlocked position, during a lowering movement of pilot axle 14, spring 104 absorbing the lowering movement of pilot axle 14 in this instance. As previously stated, member 130 preferably constitutes a conventional Bowden wire, which as will be understood is effective to transmit movement when under tension and also under compression. Accordingly, up and down movements of pilot axle 14 are transmitted as corresponding movements of member 130 so that the position of the end of the latter within the vehicle may serve as a convenient indication to the operator of the raised or lowered position of the pilot axle and pilot wheels.

Although a specific embodiment of the present invention has been described, it will be evident that various modifications in the form, number and arrangement of parts may be made within the spirit and scope thereof.

What is claimed is:

1. In a combined road and rail vehicle having a pair of dirigible main wheels, steering mechanism associated therewith and a pair of pilot wheels for guiding said main wheels during rail travel only, means for raising and lowering said pilot wheels from and to track-engaging position, and means controlled by said raising and lowering mechanism for locking said steering mechanism against actuation.

2. In a combined road and rail vehicle having a pair of dirigible main wheels, steering mechanism therefor and a pair of pilot wheels for guiding said main wheels during rail travel only, means for raising and lowering said pilot wheels from and to track-engaging position, and means responsive to movement of said pilot wheel to track-engaging position for locking said steering mechanism against actuation.

3. In a combined road and rail vehicle having a pair of dirigible main wheels and a pair of pilot wheels for guiding said main wheels during rail travel only, means for raising and lowering said pilot wheels from and to track-engaging position, means for holding said main wheels in straight-ahead position, and means controlled by said raising and lower mechanism for controlling said holding means.

4. In a combined road and rail vehicle having a pair of dirigible main wheels and a pair of raisable and lowerable pilot wheels for guiding said main wheels during rail travel only, means for holding said main wheels in straight-ahead position, and means responsive to a lowering movement of said pilot wheels for actuating said holding means.

5. In a combined road and rail vehicle having a pair of dirigible main wheels and a pair of raisable and lowerable pilot wheels for guiding said main wheels during rail travel only, locking mechanism adapted to respond to movement of said main wheels to straight-ahead position for locking said wheels in said straight-ahead position, and means controlled in accordance with the raised or lowered position of said pilot wheels for controlling said locking mechanism.

6. In a combined road and rail vehicle having a pair of dirigible main wheels and a pair of raisable and lowerable pilot wheels for guiding said main wheels during rail travel only, locking mechanism adapted to be pre-set so as to respond to movement of said main wheels to straight-ahead position for locking said wheels in said straight-ahead position, and means controlled in accordance with the position of said pilot wheels for pre-setting said locking mechanism.

7. In a combined road and rail vehicle having a pair of dirigible main wheels and a pair of pilot wheels for guiding said main wheels during rail travel only, means for raising and lowering said pilot wheels from and to track-engaging position, a pivotally mounted locking dog, and an actuating connection between said pilot wheels and said locking dog adapted to move said dog into position to lock said main wheels in straight-ahead position when said pilot wheels are lowered to track-engaging position.

8. In a combined road and rail vehicle having a pair of dirigible main wheels and an axle therefor, a pair of pilot wheels and an axle therefor for guiding said main wheels during rail travel only, said pilot wheels being raisable and lowerable from and to track engaging position, means connecting said main and pilot axles and adapted to maintain them in transverse alignment, a locking dog pivotally supported by said main axle and adapted to lock said main wheels in straight-ahead position, and a connection between said dog and said aligning member adapted to move said dog into locking position upon a lowering movement of said pilot wheels.

9. In a combined road and rail vehicle having a pair of dirigible main wheels carried by a main axle and a pair of pilot wheels carried by a pilot axle for guiding said main wheels during rail travel only, steering mechanism associated with said main wheels, raising and lowering mechanism associated with said pilot wheels, an aligning frame connected between said main and pilot axles, a dog pivotally supported on said main axle, a locking plate carried by said steering mechanism and movable into registry with said dog when said main wheels are in straight-ahead position, and a connection between said aligning frame and said dog so that the latter is actuated to locking position with respect to said plate upon movement of said pilot wheels to track-engaging position.

10. In a combined road and rail vehicle having a pair of dirigible main wheels, a pair of pilot wheels for guiding said main wheels during rail travel only and raisable and lowerable from and to track-engaging position, means adapted to respond to a lowering movement of said pilot wheels for locking said main wheels in straight-ahead position, and a manually controlled member for selectively rendering said locking means non-responsive to said lowering movement.

11. In a combined road and rail vehicle having a pair of dirigible main wheels, a pair of pilot wheels for guiding said main wheels during rail travel only and raisable and lowerable from and to track-engaging position, means adapted to respond to a lowering movement of said pilot wheels for locking said main wheels in straight-ahead position, and a manual means actuable from within the vehicle for rendering said locking means non-responsive to said lowering movement and for indicating within the vehicle the raised or lowered position of said pilot wheel.

12. In a combined road and rail vehicle having a pair of dirigible main wheels, a pair of pilot wheels for guiding said main wheels during rail travel only and raisable and lowerable from and to track-engaging position, means including a resilient mechanism adapted to respond to a lowering movement of said pilot wheels for locking said main wheels in straight-ahead position, and a manually controlled member selectively actuable to retain said locking means ineffective against the force of said resilient member.

SULO M. NAMPA.
DAVID W. MAIN.